US010038324B2

United States Patent
Nirantare et al.

(10) Patent No.: US 10,038,324 B2
(45) Date of Patent: Jul. 31, 2018

(54) METHODS, CIRCUITS AND ARTICLES OF MANUFACTURE FOR CONTROLLING WIRELESS POWER TRANSFER RESPONSIVE TO CONTROLLER CIRCUIT STATES

(71) Applicant: Eaton Corporation, Cleveland, OH (US)

(72) Inventors: Prasanna Nirantare, Pune (IN); Tiefu Zhao, Milwaukee, WI (US); Birger Pahl, Milwaukee, WI (US); Milind Kothekar, Dombivli (IN); Yahan Hua, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 579 days.

(21) Appl. No.: 14/590,452

(22) Filed: Jan. 6, 2015

(65) Prior Publication Data

US 2016/0197485 A1    Jul. 7, 2016

(51) Int. Cl.
| | |
|---|---|
| H01F 27/42 | (2006.01) |
| H01F 37/00 | (2006.01) |
| H01F 38/00 | (2006.01) |
| H02J 5/00 | (2016.01) |
| H01F 38/14 | (2006.01) |

(Continued)

(52) U.S. Cl.
CPC .............. *H02J 5/005* (2013.01); *H01F 38/14* (2013.01); *H02J 7/025* (2013.01); *H02J 50/12* (2016.02); *H02J 50/80* (2016.02)

(58) Field of Classification Search
CPC ....... H02J 7/025; H02J 50/12; Y02B 70/1433; H02M 3/33523; H02M 1/12
See application file for complete search history.

(56) References Cited

U.S. PATENT DOCUMENTS

| | | | |
|---|---|---|---|
| 2,568,169 | A | 9/1951 | Raczynski |
| 3,484,727 | A | 12/1969 | Weber et al. |

(Continued)

FOREIGN PATENT DOCUMENTS

| | | |
|---|---|---|
| CN | 102468741 | 5/2012 |
| CN | 202309183 U | 7/2012 |

(Continued)

OTHER PUBLICATIONS

U.S. Appl. No. 14/323,436 entitled "Wireless Power Transfer Systems Using Load Feedback" filed Jul. 3, 2014.

(Continued)

*Primary Examiner* — Jared Fureman
*Assistant Examiner* — Esayas Yeshaw
(74) *Attorney, Agent, or Firm* — Ward and Smith, P.A.

(57) ABSTRACT

A wireless power transfer circuit can include an input port that can be configured to couple to a power source, an ac excitation circuit having a port coupled to the input port, a resonant circuit coupled to the ac excitation circuit, and a controller circuit that can be configured to operate the ac excitation circuit. The wireless power transfer circuit can operate to inductively transfer power from the resonant circuit and the controller circuit can be configured to change an operating frequency of the ac excitation circuit and change a configuration of the resonant circuit responsive a change in indicated efficiency of the wireless power transfer.

23 Claims, 5 Drawing Sheets

(51) Int. Cl.
*H02J 7/02* (2016.01)
*H02J 50/12* (2016.01)
*H02J 50/80* (2016.01)

(56) References Cited

U.S. PATENT DOCUMENTS

| | | | |
|---|---|---|---|
| 4,471,335 A | 9/1984 | Moritz et al. | |
| 5,923,152 A | 7/1999 | Guerrera | |
| 6,060,875 A | 5/2000 | Capici et al. | |
| 6,198,375 B1 | 3/2001 | Shafer | |
| 7,411,479 B2 | 8/2008 | Baarman et al. | |
| 7,495,414 B2 | 2/2009 | Hui | |
| 7,554,430 B2 | 6/2009 | Mehrotra et al. | |
| 7,639,110 B2 | 12/2009 | Baaraman et al. | |
| 8,138,875 B2 | 3/2012 | Baarman et al. | |
| 8,380,998 B2 | 2/2013 | Azancot et al. | |
| 8,531,059 B2 | 9/2013 | Ichikawa et al. | |
| 8,669,678 B2 | 3/2014 | Urano | |
| 8,698,350 B2 | 4/2014 | Kanno | |
| 9,006,935 B2 * | 4/2015 | Fukushima | H02J 5/005 307/104 |
| 9,257,851 B2 * | 2/2016 | Baarman | H02J 5/005 |
| 2003/0201860 A1 | 10/2003 | Yang | |
| 2006/0049907 A1 | 3/2006 | Liu | |
| 2007/0007935 A1 | 1/2007 | Johnson | |
| 2008/0122543 A1 | 5/2008 | Silver | |
| 2008/0204116 A1 * | 8/2008 | James | G01D 5/2093 327/517 |
| 2010/0148723 A1 * | 6/2010 | Cook | G06K 7/0008 320/108 |
| 2011/0049997 A1 | 3/2011 | Urano | |
| 2011/0080053 A1 | 4/2011 | Urano | |
| 2011/0127845 A1 * | 6/2011 | Walley | H02J 5/005 307/104 |
| 2011/0127846 A1 | 6/2011 | Urano | |
| 2011/0163542 A1 | 7/2011 | Farkas | |
| 2011/0304216 A1 | 12/2011 | Baarman | |
| 2012/0043825 A1 | 2/2012 | Urano | |
| 2012/0049647 A1 * | 3/2012 | Kim | H02J 5/005 307/104 |
| 2012/0086281 A1 | 4/2012 | Kanno | |
| 2012/0112719 A1 | 5/2012 | Xia et al. | |
| 2012/0193993 A1 | 8/2012 | Azancot et al. | |
| 2012/0212068 A1 | 8/2012 | Urano | |
| 2012/0280575 A1 | 11/2012 | Kim et al. | |
| 2012/0293118 A1 | 11/2012 | Kim et al. | |
| 2012/0294045 A1 | 11/2012 | Fornage et al. | |
| 2013/0033117 A1 | 2/2013 | Kim et al. | |
| 2013/0154382 A1 * | 6/2013 | Kurata | H02J 17/00 307/104 |
| 2013/0187625 A1 | 7/2013 | Mao | |
| 2013/0249304 A1 | 9/2013 | Keeling et al. | |
| 2013/0249479 A1 | 9/2013 | Partovi | |
| 2013/0328410 A1 * | 12/2013 | Georgakopoulos | H01F 27/006 307/104 |
| 2014/0049118 A1 | 2/2014 | Karalis et al. | |
| 2014/0103730 A1 * | 4/2014 | Irie | H04B 5/0037 307/104 |
| 2014/0125142 A1 * | 5/2014 | Kanno | H02J 50/12 307/104 |
| 2014/0183967 A1 | 7/2014 | Ryu et al. | |
| 2014/0203657 A1 | 7/2014 | Song et al. | |
| 2014/0361628 A1 * | 12/2014 | Huang | H01F 38/14 307/104 |
| 2015/0280455 A1 * | 10/2015 | Bosshard | H02J 5/005 307/104 |
| 2016/0001662 A1 | 1/2016 | Miller et al. | |
| 2016/0006356 A1 * | 1/2016 | Nirantare | H02M 7/06 363/21.02 |

FOREIGN PATENT DOCUMENTS

| | | |
|---|---|---|
| CN | 202444333 U | 9/2012 |
| GB | 1134208 | 2/1966 |
| JP | 2006-271027 A | 10/2006 |
| WO | WO 0225677 A2 | 3/2002 |
| WO | WO 2012/046453 A1 | 4/2012 |
| WO | WO 2013/111243 A1 | 8/2013 |
| WO | WO 2013/124359 A2 | 8/2013 |

OTHER PUBLICATIONS

U.S. Appl. No. 14/143,505 entitled "Methods, Circuits And Articles Of Manufacture For Configuring DC Output Filter Circuits" filed Dec. 30, 2013.
Braun Toothbrush Teardown, Published on May 29, 2012, EEVblog #284, Retrieved from the internet at URL https://www.youtube.com/watch?v=JJgKfTW53uo.
Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.
Nair et al. "Efficiency Enhanced Magnetic Resonance Wireless Power Transfer System and High Voltage Integrated Chip Power Recovery Scheme", *IEEE CONECCT 2014*, Jan. 6-7, 2014.
International Search Report and Written Opinion Corresponding to International Application No. PCT/IB2015/055004; dated Sep. 15, 2015; 9 Pages.
International Search Report and Written Opinion Corresponding to International Application No. PCT/US2015/066406; dated Mar. 9, 2016; 11 Pages.
International Search Report and Written Opinion Corresponding to International Application No. PCT/US2014/072667; dated Mar. 25, 2015; 9 Pages.
Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 2158-5210; 7 pages.
Chinese Office Action; corresponding CN Appln No. 201480071548.3, dated Apr. 23, 2018; 15 pages.

* cited by examiner

METHODS, CIRCUITS AND ARTICLES OF MANUFACTURE FOR CONTROLLING WIRELESS POWER TRANSFER RESPONSIVE TO CONTROLLER CIRCUIT STATES

FIELD

The present invention relates to the field of power systems, and more particularly, to wireless power transfer.

BACKGROUND

Wireless power transfer systems have been developed for a variety of different applications, including battery charging applications for vehicles, mobile electronic devices, tools, and the like. Such systems can use magnetically coupled resonant circuits to transfer energy. Examples of such wireless power transfer systems are described in U.S. Pat. No. 8,531,059 and U.S. Patent Application Publication No. 2013/0249479.

An example of control of a wireless power transfer system is described in U.S. patent application Ser. No. 14/323,436, entitled WIRELESS POWER TRANSFER SYSTEMS USING LOAD FEEDBACK, filed Jul. 3, 2014.

U.S. patent application Ser. No. 14/143,505 entitled METHODS, CIRCUITS AND ARTICLES OF MANUFACTURE FOR CONFIGURING DC OUTPUT FILTER CIRCUITS, filed Dec. 30, 2013, describes wireless power transfer systems having a transmitter including a rectifier that receives power from an AC power source, an inverter circuit that generates a higher frequency AC output voltage from a DC output produced by the rectifier, and a first resonant circuit coupled to an output of the inverter circuit. A receiver includes a second resonant circuit including a coil that is configured to be placed in close proximity to a coil of the first resonant circuit and a rectifier circuit that produces a DC output from an AC output produced by the second resonant circuit.

SUMMARY

Embodiments according to the present invention can provide methods, circuits, and articles of manufacture for controlling wireless power transfer responsive to controller circuit states. Pursuant to these embodiments, a wireless power transfer circuit can include an input port that can be configured to couple to a power source, an ac excitation circuit having a port coupled to the input port, a resonant circuit coupled to the ac excitation circuit, and a controller circuit that can be configured to operate the ac excitation circuit. The wireless power transfer circuit can operate to inductively transfer power from the resonant circuit and the controller circuit can be configured to change an operating frequency of the ac excitation circuit and change a configuration of the resonant circuit responsive a change in indicated efficiency of the wireless power transfer.

DETAILED DESCRIPTION OF EMBODIMENTS ACCORDING TO THE INVENTION

Figure 1:
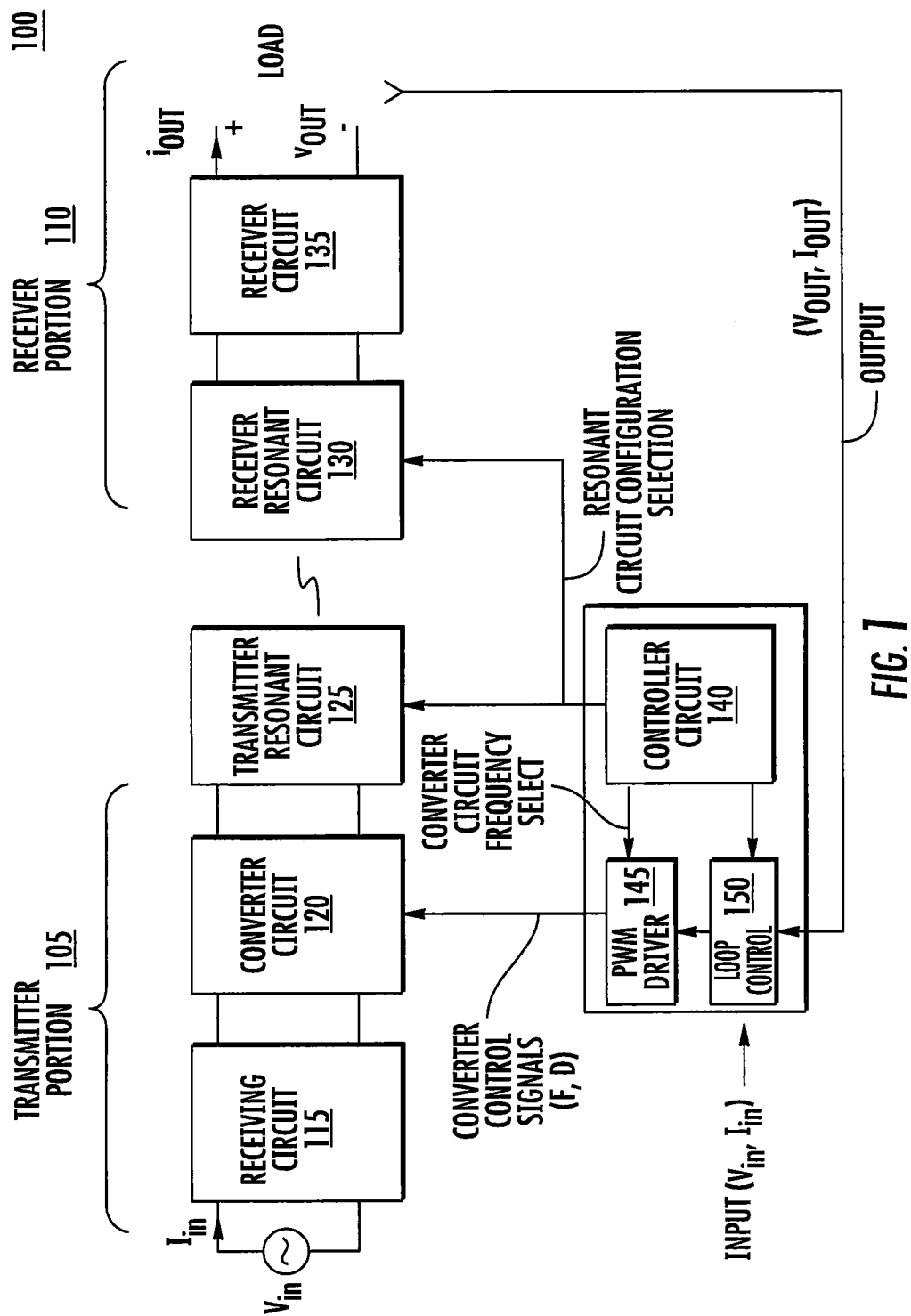
FIG. 1 is a block diagram of a wireless power transfer apparatus in some embodiments according to the invention.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes", "comprises", "including" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As described herein, in some embodiments according to the invention, a wireless power transfer can be provided by changing an operating frequency of an AC excitation circuit, such as a converter circuit, and changing the configuration of a resonant circuit driven by the excitation circuit in response to a change in an indicated efficiency of the wireless power transfer relative to a specified efficiency for the wireless power transfer. For example, a wireless power transfer circuit can be specified to deliver a particular power to a load in response to a given input voltage.

The wireless power should also be transferred to the load at a specified efficiency, such as more than 96% in some applications. When, however, the spacing between the transmitter and receiver coils changes or the load changes, the wireless transfer efficiency can be reduced. As appreciated by the present Inventors, when there is an indication that the efficiency of the wireless power transfer has changed, a controller circuit can change the operating frequency of the converter circuit, as well as change the configuration of a resonant circuits, in order to increase the efficiency of the wireless power transfer.

In some embodiments according to the invention, wireless power transfer efficiency can be indicated by a duty cycle of a control signal for the converter circuit. In response, the controller circuit can change the operating frequency of the converter circuit and change the configuration of the transmitter and receiver resonant circuits (the circuits used to inductively transfer the power across the gap in the coils) so that the resonant frequencies of both circuits better match. For example, the configuration of a receiver resonant circuit included in the receiver portion can be changed to match the transmitter resonant circuit.

FIG. 1 is a block diagram of a wireless power transfer apparatus 100 including a transmitter portion 105 and a receiver portion 110 in some embodiments according to the invention. According to FIG. 1, the transmitter portion 105 wirelessly transfers power from the input across a gap to the receiver portion 110 which drives the load. The wireless power transfer apparatus 100 can be specified to deliver a particular power to the load at a particular output voltage. For example, in some embodiments according to the invention, the wireless power transfer apparatus 100 can be specified to deliver 6 kW at 400 volts to a range of loads at an efficiency of greater than about 96%, where the input voltage is about 720 volts. Accordingly, during a wide range of operations, the wireless power transfer apparatus 100 should deliver the power at the specified efficiency.

As further shown in FIG. 1, the transmitter portion 105 includes a rectifier circuit 115 that converts an AC input voltage to provide a DC voltage at an input of a converter circuit 120. The converter circuit 120 converts the DC voltage to an AC excitation which is used to inductively transfer power to the receiver portion 110.

It will be understood that although FIG. 1 shows a converter circuit 120 converting the DC voltage to an AC excitation, other types of circuits may be used. For example, the converter circuit 120 may be any circuit which provides an AC excitation (such as an AC current) so that power may be inductively transferred to the receiver portion 110. For example, an AC excitation circuit, such as that described in U.S. patent application Ser. No. 14/323,436, may be used as the converter circuit 120.

The AC excitation is provided to a transmitter resonant circuit 125 for wireless power transfer. In particular, the transmitter resonant circuit 125 transmits power across the gap that separates the coils of the transmitter and receiver portions 105, 110 when both are configured to operate at or near the same resonant frequency.

It will be understood that the converter circuit 120 and transmitter resonant circuit 125 can operate responsive to a controller circuit 140, a pulse-width modulation driver circuit 145 and a loop control circuit 150. During operation, the controller circuit 140 provides a control signal to operate the converter circuit 120 at a particular operating frequency to maintain resonance with the transmitter resonant circuit 125. For example, in some embodiments according to the invention, the converter control signals provided by the pulse-width modulation driver circuit 145 have an operating frequency of about 40 kHz. Furthermore, the transmitter resonant circuit 125 is configured to include components coupled to one another so that the resonant frequency for the circuit 125 is also about equal to 40 kHz.

As further shown in FIG. 1, the wireless power transmitted by the transmitter resonant circuit 125 is received by the receiver resonant circuit 130 included in the receiver portion 110. It will be understood that, in operation, the controller circuit 140 can also maintain the configuration of the receiver resonant circuit 130 to have the same resonant frequency as that provided by the transmitter resonant circuit 125. The receiver resonant circuit 130 provides an AC signal to a rectifier circuit 135 which drives the output connected to the load.

Still referring to FIG. 1, during operation of the wireless power transfer apparatus 100, the efficiency of the transfer may be reduced if, for example, the spacing or alignment between the coils in the transmitter and receiver portions 105, 110 changes or if the characteristics of the load were to change. For example, in some embodiments according to the invention, the efficiency of the wireless power transfer may be reduced if the coil in the transmitter portion 105 is moved away from the coil in the receiver portion 110 thereby decreasing the coupling coefficient between the transmitter resonant circuit 125 and the receiver resonant circuit 130. Still further, the alignment between the transmitter resonant circuit 125 and the receiver resonant circuit 130 may also change thereby leading to a reduction in the efficiency. Still further, if the characteristics of the load driven by the wireless power transfer changes, the efficiency of the wireless power transfer can also change. For example, if the load is a battery, the input impedance of the battery may change as the battery nears its full charge, which may be reflected by a reduction in the efficiency of the transfer.

According to FIG. 1, the efficiency of the wireless power transfer can be indicated by parameters associated with the load. For example, as shown in FIG. 1, the output voltage $V_{out}$ and the output current $I_{out}$ can be fed back to the loop control circuit 150, which can also receive the characteristics of the input, such as the input voltage $V_{in}$ and the input current $L_{in}$. These parameters can indicate a change in the efficiency of the wireless power transfer. In still further embodiments according to the invention, the efficiency of the wireless power transfer can be measured using other indications.

When the output parameters, such as the output voltage $V_{out}$, of the wireless power transfer drops, the loop control circuit 150 may control the pulse-width modulation driver circuit 145 to change the duty cycle of the converter control signals to the converter circuit 120. Changing the duty cycle of the converter control signals can increase the amount of "on time" during which the converter circuit 120 provides the AC excitation to the transmitter resonant circuit 125 to inductively transfer additional power to the load. If, however, the duty cycle of the converter control signals are changed to outside a specified operating range for the converter circuit 120, the efficiency of the wireless power transfer may be unacceptably reduced.

As appreciated by the present Inventors, the control circuit 140 can change the operating frequency of the control signals to the converter circuit 120 in response to the reduction in efficiency of the wireless power transfer. Still further, the controller circuit 140 can change the configuration of the transmitter resonant circuit 125 to have a new resonant frequency that substantially matches the new operating frequency of the converter circuit 120. For example, in some embodiments according to the invention, the controller circuit 140 can change the operating frequency of the converter control signals from 20 kHz to 40 kHz. The controller circuit can also select a different configuration for the transmitter resonant circuit 125 to change the resonant frequency from 20 kHz to 40 kHz, thereby maintaining resonance with the new converter circuit operating frequency of 40 kHz. Still further, the controller circuit 140 also can provide the same new resonant circuit configuration for the receiver resonant circuit 130. Accordingly, the wireless power transfer can be conducted at the new resonant frequency of 40 kHz, rather than 20 kHz so that the efficiency of the wireless power transfer can be increased back toward the specified wireless power transfer efficiency for the apparatus 100.

Figure 2:
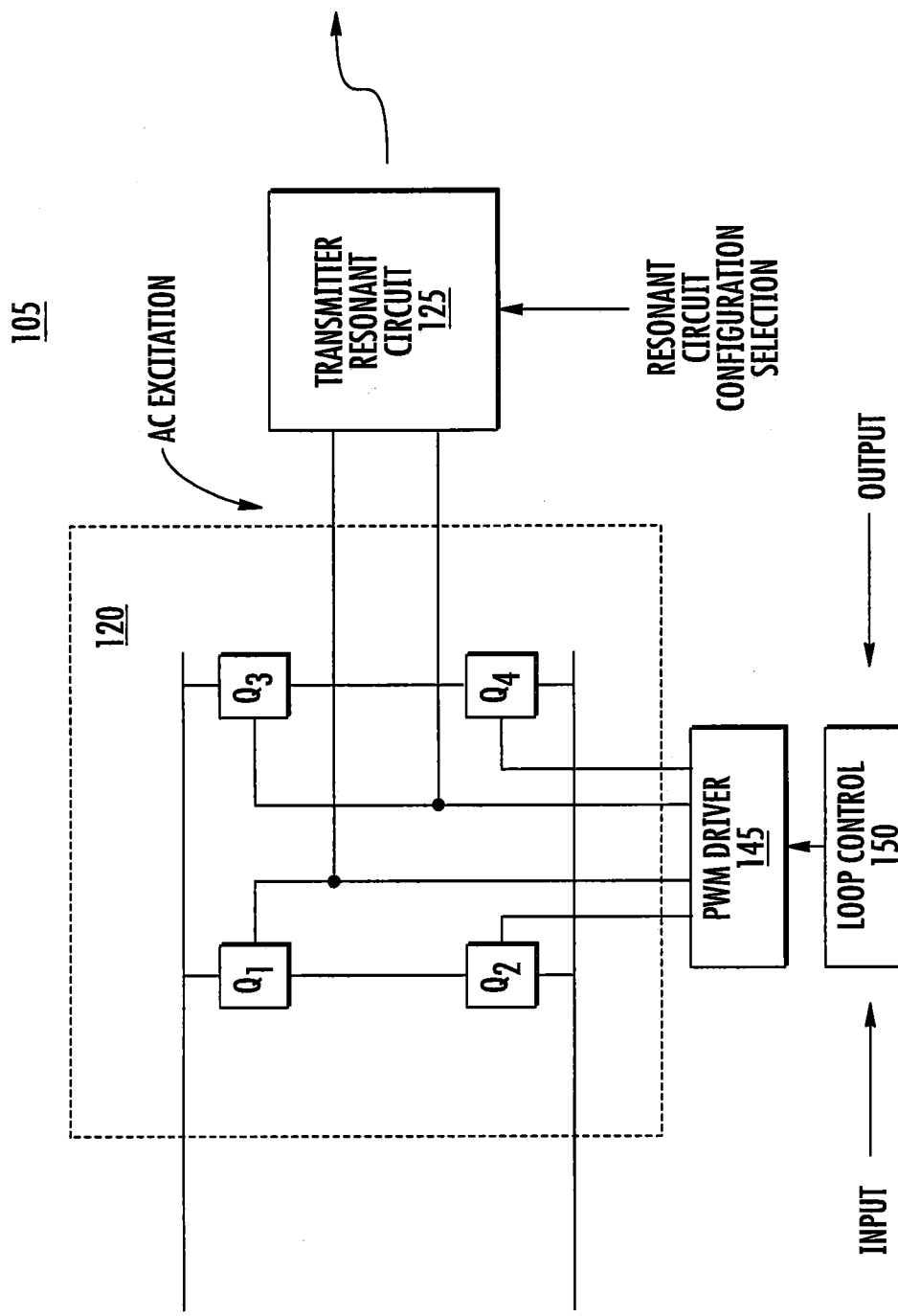
FIG. 2 is a block diagram of a converter circuit coupled to a transmitter resonant circuit included in the wireless power transfer apparatus shown in FIG. 1 in some embodiments according to the invention.

FIG. 2 is a more detailed schematic view of the converter circuit 120 shown in FIG. 1. According to FIG. 2, the pulse-width modulation driver circuit 145 provides the converter control signals to each of a plurality of electronically controlled switches Q1-Q4 arranged in an H Bridge topology. As described above with reference to FIG. 1, the pulse-width modulation driver circuit 145 provides the control signals at a selected operating frequency and having a particular duty cycle under the control of the loop control circuit 150 and the control circuit 140. As further shown in FIG. 2, the converter circuit 120 provides the AC excitation $I_{AC}$ to the transmitter resonant circuit 125. The transmitter resonant circuit 125 also receives a resonant circuit configuration selection signal from the controller circuit 140 maintain resonance with the newly selected operating frequency of the converter.

Figure 3:
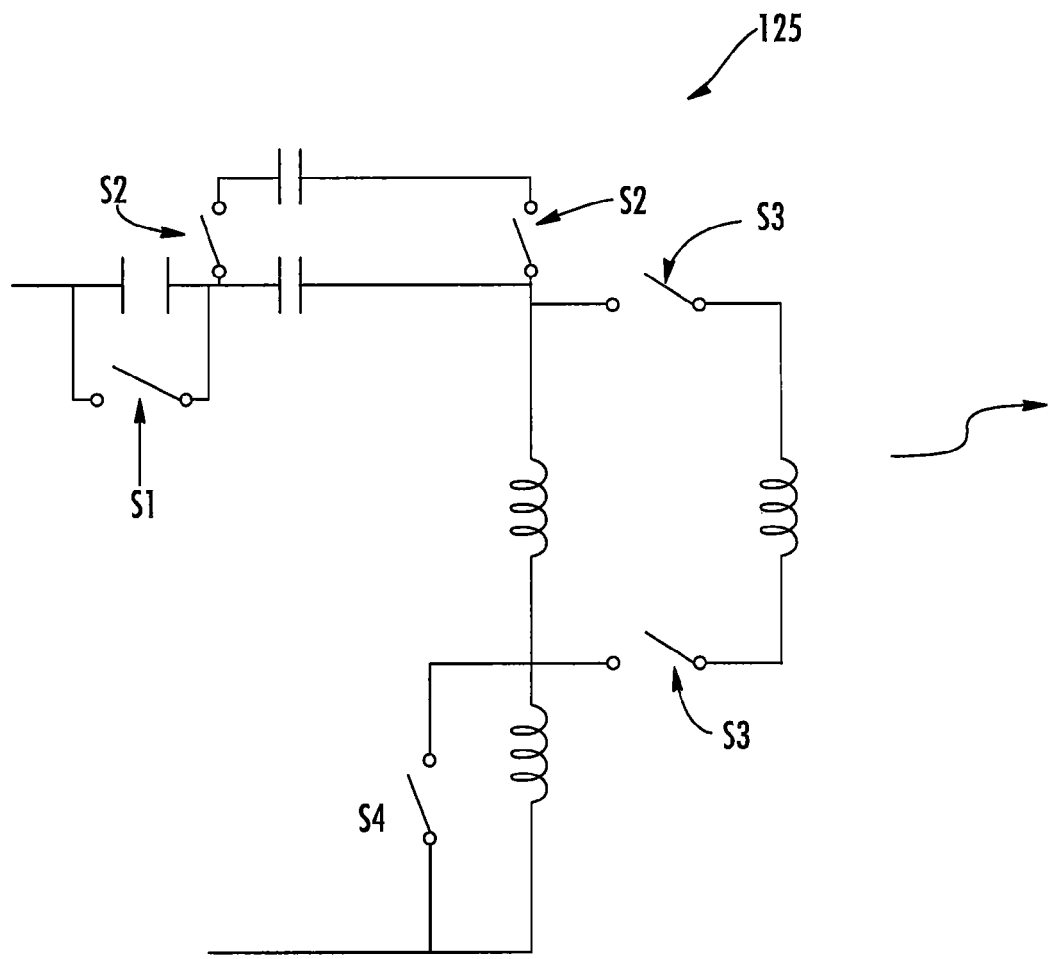
FIG. 3 is a schematic illustration of a resonant circuit having selectable configurations in some embodiments according to the invention.

FIG. 3 is a more detailed schematic illustration of the transmitter resonant circuit 125 shown in FIG. 1 in some embodiments according to the invention. According to FIG. 3, the transmitter resonant circuit 125 provides a plurality of capacitive components C as and a plurality of inductive components L each of which may have an associated set of switches so that the configuration of the transmitter resonant circuit 125 may be selected by the controller circuit 140 to maintain resonance with the operating frequency of the converter circuit 120. For example, and according to FIG. 3, the transmitter resonant circuit 125 can include a capacitor C1 and an inductor L1 which are included in a default configuration. Still further, capacitive elements C2 and C3 may be selectively added to (or remove from) the transmitter resonant circuit 125 by placing the switches S1 and S2 in the appropriate positions.

The transmitter resonant circuit 125 also includes additional inductive components L2 and L3 and associated switches S3 and S4 which may be placed in the appropriate positions to switch L2 and L3 into/out of the transmitter resonant circuit 125. Other types of selective arrangements may also be provided by the transmitter resonant circuit 125 such as variable capacitors and variable inductors which may be controlled by the resonant circuit configuration selection signal provided by the controller circuit 140. In operation, therefore, the controller circuit 140 determines the appropriate operating frequency for the converter control signals and the matching configuration for the transmitter resonant circuit 125 to increase the efficiency of the wireless power transfer. Still further, the same type of arrangement shown in FIG. 3 may also be provided to the receiver resonant circuit 130 so that resonance may be maintained between the transmitter resonant circuit 125 and the receiver resonant circuit 130 during wireless power transfer.

Figure 4:
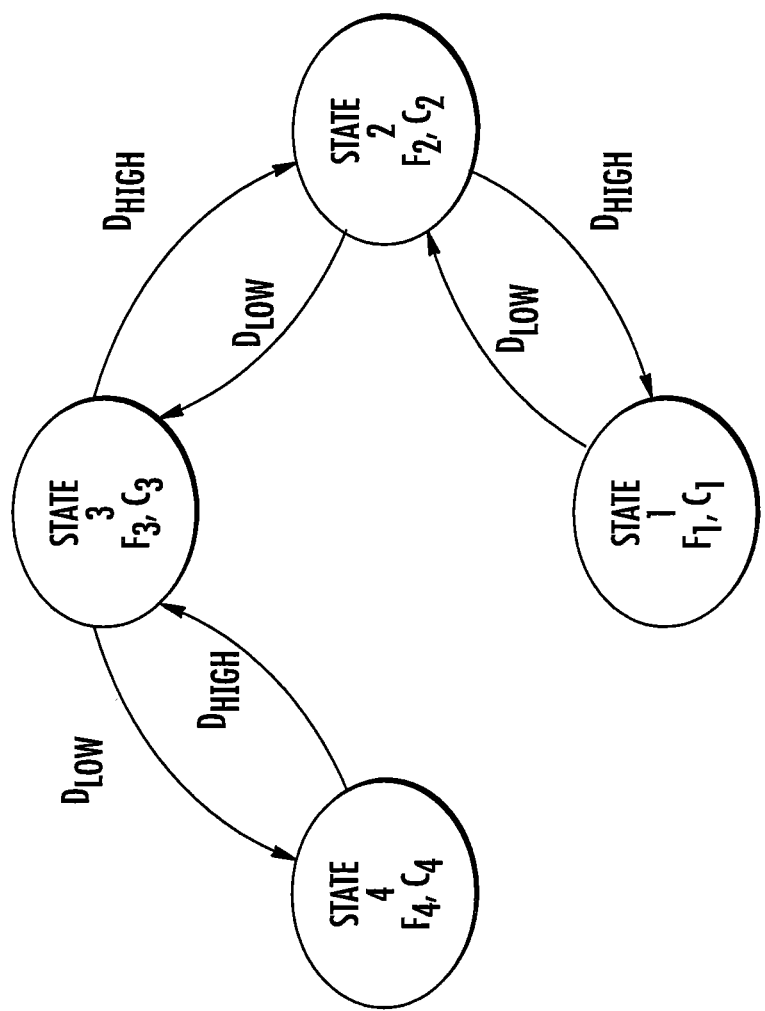
FIG. 4 is a state diagram illustrating operations of a controller circuit included in the wireless power transfer apparatus shown in FIG. 1 in some embodiments according to the invention.

FIG. 4 is a state diagram that illustrates operations of the controller circuit 140 in some embodiments according to the invention. According to FIG. 4, the controller circuit 140 may operate in a default state S1 wherein a first operating frequency $F_1$ is provided for the converter control signals and a first configuration $C_1$ is provided to the transmitter resonant circuit 125. The controller circuit 140 may maintain operations within the state S1 over a specified operating range for the duty cycle of the converter control signals. Although the duty cycle of the converter control signals is used herein as an indication of the efficiency of the wireless power transfer, other types of indications may also be used.

Figure 5:
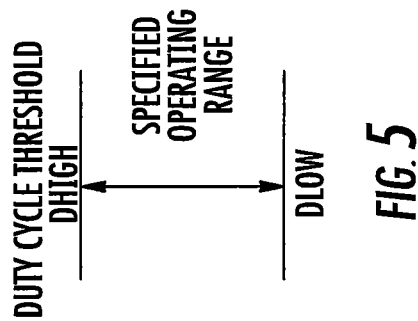
FIG. 5 is a diagram illustrating a specified operating range for a duty cycle of a control signal used to modulate the converter circuit of FIG. 2 in some embodiments according to the invention.

As shown in FIG. 4, the controller circuit 140 may remain in the state S1 while the duty cycle remains within the specified operating range. In other words, the wireless power transfer may be carried out over a range of duty cycles for the converter control signals that fall within the specified operating range shown in FIG. 5. When, however, the duty cycle changes to outside the specified operating range, the control circuit 140 may transition from the first state S1 to a second state S2 which includes changing the operating frequency of the converter control signals and the configuration of the transmitter resonant circuit 125 as well (as the configuration of the receiver resonant circuit 130). In particular, if while operating in state S1, the duty cycle falls below a lower threshold $D_{low}$, the controller circuit may transition to the second state S2.

It will be understood that the controller circuit may operate in the second state S2 while the duty cycle stays within the specified operating range. When, however, the duty cycle again transitions to outside the specified operating range, the controller circuit may make another state change. In particular, the controller circuit 140 may transition back to the first state S1 when the duty cycle exceeds an upper threshold $D_{high}$ or may transition to a third state S3 when the duty cycle drops below the lower threshold $D_{low}$.

Still referring to FIG. 4, the controller circuit 140 may remain in the state S3 while the duty cycle remains within the specified operating range. When, the duty cycle transitions outside the specified operating range past either one of the thresholds shown in FIG. 5, the controller circuit 140 may change to a fourth state S4 or may transition back to the second state S2 as shown in FIG. 4. Still further, once in the fourth state S4, the controller circuit may remain there while the duty cycle remains within the specified operating range but may transition back to the third state S3 if the duty cycle transitions outside the specified operating range past either the lower threshold $D_{low}$, or the high threshold $D_{high}$.

Although four states are shown in FIG. 4, any number of states can be used. Still further, although the thresholds shown for each of the states S1-S4 are the same, it will be understood that the thresholds used in each of the states may be different in some embodiments according to the invention.

Figure 6:
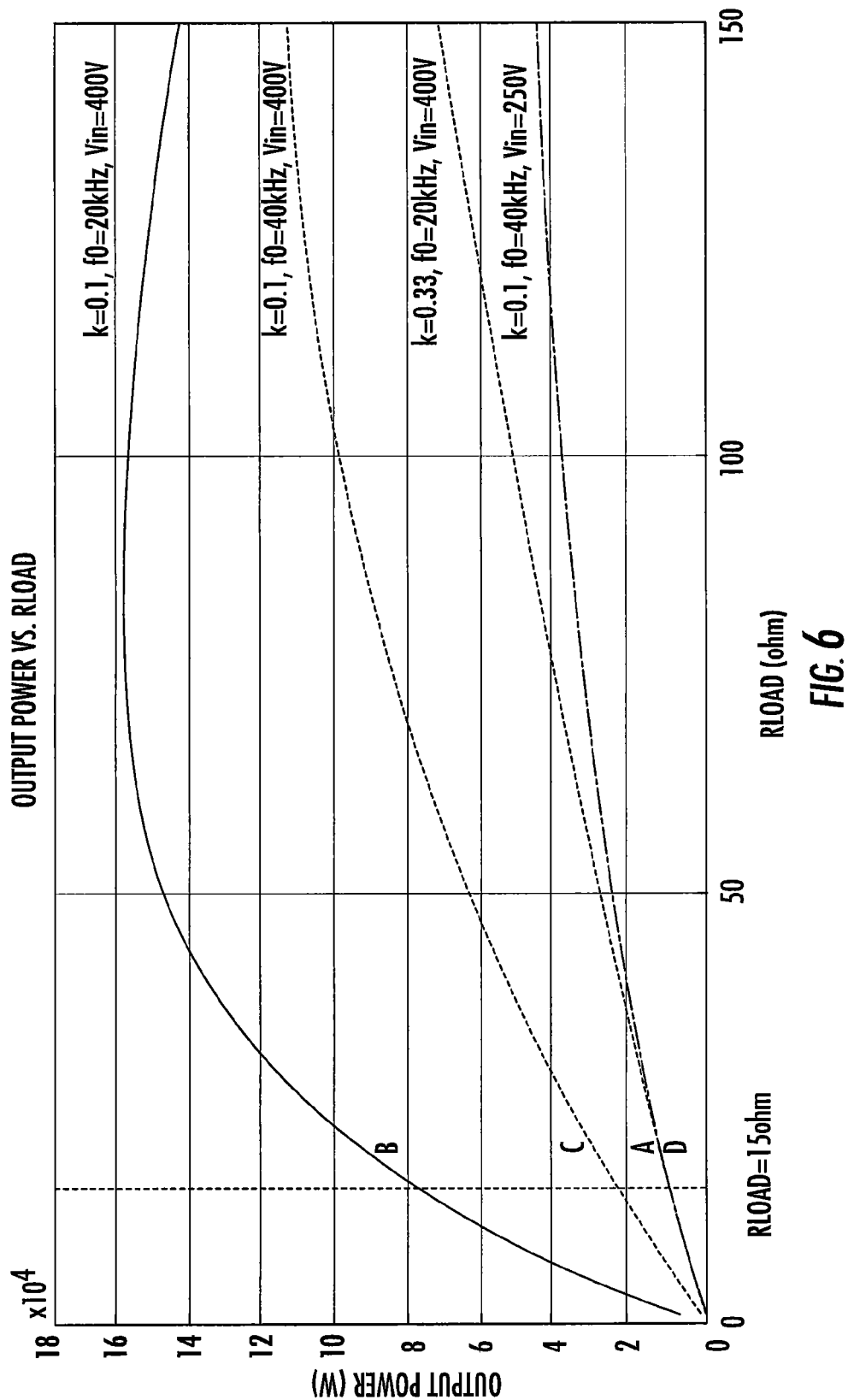
FIG. 6 is a graph illustrating different power mode curves followed by the wireless power transfer apparatus of FIG. 1 operating in the different states provided by the controller circuit of FIG. 4 in some embodiments according to the invention.

FIG. 6 is a graphical representation of a series of simulated exemplary power curves corresponding to operation of the wireless power transfer apparatus 100 configured using appropriate components. Referring to FIG. 6, a power curve A corresponds to operations of the wireless power transfer, apparatus 100 with a coupling coefficient of 0.33 between the transmitter and receiver coils so that the converter circuit 120 operates at 20 kHz and the configurations of the transmitter resonant circuit 125 and the receiver resonant circuit 130 are both 20 kHz. The operation reflected by curve A illustrates that the wireless power transfer occurs within the specified efficiency which is reflected by the output power W at the rated load $R_{load}$. When the gap between the transmitter and receiver coils increases, the coupling ratio decreases to 0.1 resulting in an efficiency that falls below the specified efficiency at the rated load $R_{load}$.

In response, the controller circuit 140 can change the operating frequency of the converter control signals to 40 kHz, and change the configuration of the transmitter resonant circuit 125 and the receiver resonant circuit 130 to each have a configuration that has a resonant frequency of about 40 kHz, which is reflected by the curve C. The change in the frequency of converter control signals to about 40 kHz is responsive to the duty cycle falling below the lower threshold $D_{low}$ while trying to reduce the power curve from power curve B back to power curve A at a coupling value of 0.1. As shown by curve C, the power curve drops relative to curve B, illustrating an increase in the efficiency of the wireless power transfer at the rated load $R_{load}$. Still further, the loop control circuit 150 can modify the duty cycle of the converter control signals to further reduce the power curve to power curve D back to the required output voltage/power at $R_{load}$ despite the coupling ratio still remaining at 0.1. It will be understood that the efficiency of the wireless power transfer apparatus 100 illustrated by FIG. 6 is increased by about 9% by carrying out the operations shown therein in some embodiments.

As described herein, in some embodiments according to the invention, a wireless power transfer can be provided by changing an operating frequency of an AC excitation circuit, such as a converter circuit, and changing the configuration of a resonant circuit in response to a change in an indicated efficiency of the wireless power transfer relative to a specified efficiency for the wireless power transfer. For example, a wireless power transfer circuit can be specified to deliver a particular power to a load in response to a given input voltage.

The wireless power should also be transferred to the load at a specified efficiency, such as more than 96% in some applications. When, however, the spacing between the transmitter and receiver coils changes or the load changes, the wireless transfer efficiency can be reduced. As appreciated by the present Inventors, when there is an indication that the efficiency of the wireless power transfer has changed, a controller circuit can change the operating frequency of the converter circuit, as well as change the configuration of a resonant circuits, in order to increase the efficiency of the wireless power transfer.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit", "module", "component", or "system". Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, circuits and articles of manufacture including computer readable code according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor or controller circuit of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. A method of operating a wireless power transfer circuit to provide a wireless power transfer, the wireless power transfer circuit including a transmitter portion comprising an input port configured to couple to a power source, an ac excitation circuit having a port coupled to the input port, a resonant circuit coupled to the ac excitation circuit, and a controller circuit configured to operate the ac excitation circuit, the method comprising:
    inductively transferring power from the resonant circuit;
    changing an operating frequency of the ac excitation circuit and a configuration of the resonant circuit responsive a change in indicated efficiency of the wireless power transfer; and
    transmitting an indication to change a configuration of a resonant circuit included in a receiver portion of the wireless power transfer circuit by adding or removing components to/from the configuration, based on the indicated efficiency of the wireless power transfer.

2. The method of claim 1 further comprising:
    selecting the configuration of the resonant circuit included in the receiver portion of the wireless power transfer circuit responsive to the indicated efficiency to provide a new configuration for the resonant circuit included in the receiver portion of the wireless power transfer circuit; and
    inductively receiving power from the transmitter portion using the new configuration.

3. The method of claim 1 wherein changing an operating frequency of the ac excitation circuit and changing a configuration of the resonant circuit comprises:
    operating the controller circuit in a first operating state including selecting a first operating frequency for the ac excitation circuit and selecting a first configuration for the resonant circuit;
    inductively transferring power from the resonant circuit using the first operating state;
    transitioning operation of the controller circuit to a second operating state including selecting a second operating frequency for the ac excitation circuit and selecting a second configuration for the resonant circuit responsive to a reduction in the indicated efficiency of the wireless power transfer while in the first operating state; and
    inductively transferring power from the resonant circuit using the second operating state.

4. The method of claim 3 further comprising:
    adjusting a duty cycle for control of the ac excitation circuit in the second operating state to control an output parameter of the wireless power transfer.

5. The method of claim 3 wherein the reduction in the indicated efficiency of the wireless power transfer is indicated by a change in a duty cycle associated with operation of the ac excitation circuit.

6. The method of claim 5 wherein the change in the duty cycle provides a new duty cycle that is outside a predetermined range for operation of the ac excitation circuit in the first operating state.

7. The method of claim 5 wherein transitioning operation of the controller circuit comprises transitioning the operation of the controller circuit to the second operating state in response to a first change in the duty cycle, wherein the method further comprises:
    transitioning operation of the controller circuit to a third operating state including selecting a third operating frequency for the ac excitation circuit and selecting a third configuration for the resonant circuit responsive to a second change in the duty cycle while in the second operating state.

8. The method of claim 7 wherein the second change in the duty cycle provides a new duty cycle that is outside a predetermined range for operation of the ac excitation circuit in the second operating state.

9. The method of claim 7 wherein the second change in the duty cycle provides a new duty cycle that is outside a second predetermined range for operation of the ac excitation circuit in the second operating state.

10. The method of claim 6 wherein transitioning operation of the controller circuit comprises transitioning the operation of the controller circuit to the second operating state in response to a first change in the duty cycle, wherein the method further comprises:
    transitioning operation of the controller circuit back to the first operating state responsive to a change in the new duty cycle while in the second operating state.

11. The method of claim 10 wherein the change in the new duty cycle provides a second new duty cycle that is outside the predetermined range when in the second operating state.

12. The method of claim 3 wherein the first operating frequency is less than the second operating frequency and the first configuration has a resonant frequency that is less than that of the second configuration.

13. The method of claim 12, wherein the second configuration for the resonant circuit is provided by removing or adding components to the first configuration for the resonant circuit.

14. A wireless power transfer apparatus comprising:
    an input port configured to couple to a power source;
    an ac excitation circuit coupled to the input port, the ac excitation circuit configured to operate responsive to a control signal indicating an operating frequency for the ac excitation circuit to convert power from the power source to ac excitation;
    a resonant circuit coupled to the ac excitation circuit, the resonant circuit configured to operate responsive to a resonant circuit configuration selection control signal to inductively transfer the ac excitation from the resonant circuit; and
    a controller circuit, coupled to the ac excitation circuit and to the resonant circuit, the controller circuit configured to change the operating frequency for the ac excitation circuit using the control signal and configured to change a configuration of the resonant circuit using the resonant circuit configuration selection control signal responsive a change in an indicated efficiency of a wireless power transfer provided by the wireless power transfer apparatus relative to a specified efficiency of the wireless power transfer; and wherein the wireless power transfer apparatus comprises a transmitter portion configured to transmit the resonant circuit configuration selection control signal to a receiver portion of the wireless power transfer apparatus to change a configuration of a receiver resonant circuit included in receiver portion by adding or removing components to/from the configuration, based on the indicated efficiency.

15. The wireless power transfer apparatus of claim 14 the receiver portion comprising:

the receiver resonant circuit configured to receive the resonant circuit configuration selection control signal to select the configuration of the receiver resonant circuit and configured to inductively receive the ac excitation using the configuration of the receiver resonant circuit.

16. The wireless power transfer apparatus of claim 14 wherein the controller circuit is further configured to operate in a first operating state including selecting a first operating frequency for the ac excitation circuit and selecting a first configuration for the resonant circuit to inductively transfer power from the resonant circuit using the first operating state;

wherein the controller circuit is further configured to, responsive to a reduction in the indicated efficiency of the wireless power transfer while in the first operating state, transition operation of the controller circuit to a second operating state that includes selecting a second operating frequency for the ac excitation circuit and selecting a second configuration for the resonant circuit to inductively transfer power from the resonant circuit using the second operating state.

17. The wireless power transfer apparatus of claim 16 wherein the controller circuit is further configured to adjust a duty cycle for control of the ac excitation circuit in the second operating state to maintain a specified output of the wireless power transfer.

18. The wireless power transfer apparatus of claim 16 wherein the reduction in the indicated efficiency of the wireless power transfer is indicated by a change in a duty cycle associated with operation of the ac excitation circuit.

19. The wireless power transfer apparatus of claim 18 wherein the change in the duty cycle provides a new duty cycle that is outside a predetermined range for operation of the ac excitation circuit in the first operating state.

20. The wireless power transfer apparatus of claim 19 wherein the controller circuit is configured to transition to the second operating state in response to a first change in the duty cycle, wherein the controller circuit is further configured to transition back to the first operating state responsive to a change in the new duty cycle while in the second operating state.

21. The wireless power transfer apparatus of claim 20 wherein the change in the new duty cycle provides a second new duty cycle that is outside the predetermined range when in the second operating state.

22. The wireless power transfer apparatus of claim 16 wherein the first operating frequency is less than the second operating frequency and the first configuration has a resonant frequency that is less than that of the second configuration.

23. The wireless power transfer apparatus of claim 22, wherein the resonant circuit is configured to remove or add components to the first configuration for the resonant circuit responsive to the resonant circuit configuration selection control signal.

* * * * *